(12) United States Patent
Cotte et al.

(10) Patent No.: US 8,307,994 B2
(45) Date of Patent: Nov. 13, 2012

(54) SURFACE CHARGE ENABLED NANOPOROUS SEMI-PERMEABLE MEMBRANE FOR DESALINATION

(75) Inventors: John M. Cotte, Yorktown Heights, NY (US); Christopher V. Jahnes, Yorktown Heights, NY (US); Hongbo Peng, Yorktown Heights, NY (US); Stephen M. Rossnagel, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/607,258

(22) Filed: Oct. 28, 2009

(65) Prior Publication Data

US 2011/0094884 A1    Apr. 28, 2011

(51) Int. Cl.
  *B01D 71/02* (2006.01)
  *B01D 69/00* (2006.01)
  *B05D 1/00* (2006.01)
  *B05D 3/00* (2006.01)
  *C25B 7/00* (2006.01)

(52) U.S. Cl. ............ 210/500.22; 210/502.1; 428/304.4; 427/258; 427/315.5; 95/273; 977/750; 977/752; 204/601; 204/602

(58) Field of Classification Search .................. None
See application file for complete search history.

(56) References Cited

U.S. PATENT DOCUMENTS

| 3,567,632 | A | * | 3/1971 | Richter et al. ............. 210/321.6 |
| 4,789,486 | A | | 12/1988 | Ritter |
| 5,874,154 | A | | 2/1999 | Bickford et al. |
| 6,284,412 | B1 | | 9/2001 | Minakata et al. |
| 2006/0108286 | A1 | | 5/2006 | Hambitzer et al. |
| 2006/0275138 | A1 | * | 12/2006 | Sheng et al. ..................... 417/48 |
| 2008/0006574 | A1 | * | 1/2008 | Ramaswamy et al. ........ 210/490 |
| 2008/0223795 | A1 | * | 9/2008 | Bakajin et al. ................ 210/767 |
| 2011/0220574 | A1 | * | 9/2011 | Bakajin et al. ................ 210/650 |

OTHER PUBLICATIONS

Jessensky, O., et al. Self-Organized Formation of Hexagonal Pore Arrays in Anodic Alumina. Applied Physics Letters. vol. 72, No. 10. Mar. 1998. pp. 1173-1175.

Sklar. G. et al. Pulsed Electrodeposition Into AAO Templates for CVD Growth of Carbon Nanotube Arrays. Institute of Physics Publishing. Nanotechnology Jan. 16, 2005. pp. 1265-1271.

* cited by examiner

*Primary Examiner* — Krishnan S Menon
(74) *Attorney, Agent, or Firm* — Tutunjian & Bitetto, P.C.; Louis J. Percello

(57) ABSTRACT

A filter includes a membrane having a plurality of nanochannels formed therein. A first surface charge material is deposited on an end portion of the nanochannels. The first surface charge material includes a surface charge to electrostatically influence ions in an electrolytic solution such that the nanochannels reflect ions back into the electrolytic solution while passing a fluid of the electrolytic solution. Methods for making and using the filter are also provided.

23 Claims, 7 Drawing Sheets

SURFACE CHARGE ENABLED NANOPOROUS SEMI-PERMEABLE MEMBRANE FOR DESALINATION

BACKGROUND

1. Technical Field

The present invention relates to semi-permeable membranes and more particularly to a semi-permeable nanoporous membrane and methods for making and using the same for desalination and other processes.

2. Description of the Related Art

Water desalination may be thought of in terms of two approaches. The two basic approaches for water desalination include reverse osmosis and distillation. The distillation approach requires converting fluid water to the vapor phase and condensing water from the vapor. This approach is fairly high cost and requires significant energy usage. The reverse osmosis approach uses pressure on a salinated liquid to force water molecules through a semi-permeable membrane. This approach has a relativity low rate of energy consumption.

The specific (per unit of produced potable water) energy of desalination using reverse osmosis has been reduced from over 10 kWh/m$^3$ in the 1980s to below 4 kWh/m$^3$, approaching the theoretical minimum required energy of 0.7 kWh/m$^3$. To improve the state of art of the reverse osmosis approach, new membranes, with a uniform pore distribution and a more permeable separation layer can potentially maintain or improve salt rejection while increasing the flux in the reverse osmosis method. Such improvements have not yet been developed in the conventional art.

SUMMARY

A filter includes a membrane having a plurality of nanochannels formed therein. A first surface charge material is deposited on an end portion of the nanochannels. The first surface charge material includes a surface charge to electrostatically influence ions in an electrolytic solution such that the nanochannels reflect ions back into the electrolytic solution while passing a fluid of the electrolytic solution. Methods for making and using the filter are also provided.

A filter system includes a first volume configured to receive an electrolytic solution at a pressure, and a second volume separated from the first volume by a membrane having a plurality of nanochannels formed therein. The nanochannels include a first surface charge material deposited on at least one end portion of the nanochannels. The first surface charge material includes a surface charge to electrostatically influence ions in an electrolytic solution such that the nanochannels reflect ions back into the electrolytic solution while passing a fluid of the electrolytic solution.

A method for making a filter includes forming a plurality of nanochannels in a membrane; and depositing a first surface charge material on at least one end portion of the nanochannels. The first surface charge material includes a surface charge to electrostatically influence ions in an electrolytic solution such that the nanochannels reflect ions back into the electrolytic solution while passing a fluid of the electrolytic solution.

A method for filtering an electrolytic solution includes filling a first volume with an electrolytic solution, applying a pressure below a threshold value to the electrolytic solution in the first volume, and passing a fluid of the electrolytic solution into a second volume separated from the first volume by a membrane. The membrane has a plurality of nanochannels formed therein. The nanochannels include a first surface charge material deposited on at least one end portion of the nanochannels. The first surface charge material includes a surface charge to electrostatically influence ions in an electrolytic solution such that the nanochannels reflect ions back into the electrolytic solution while passing the fluid of the electrolytic solution.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a new membrane is described, which utilizes a surface charge of nanopores and/or nanochannels. In one embodiment, for reverse osmosis, a high salt rejection is achieved while simultaneously maintaining high flux. In one embodiment, a nanoscale filter includes arrays of parallel nanopores or channels which are formed into a membrane material. The surface of the nanopore or channel is configured with a material, which has a high negative (or positive) surface charge when exposed to an electrolyte. This effect blocks the transport of ions through the channel, and is effectively an ion filter.

It is to be understood that the present invention will be described in terms of a non-limiting semi-permeable membrane formed from a material including aluminum; however, other structures, membrane materials, coating materials, process features and steps may be varied within the scope of the present invention. The membrane may be formed in sheets and cut to size or may be formed in or included with pre-sized panels.

In particularly useful embodiments, the membrane is employed for desalination of water. However, other physical or chemical processes may employ the present principles.

Figure 1:
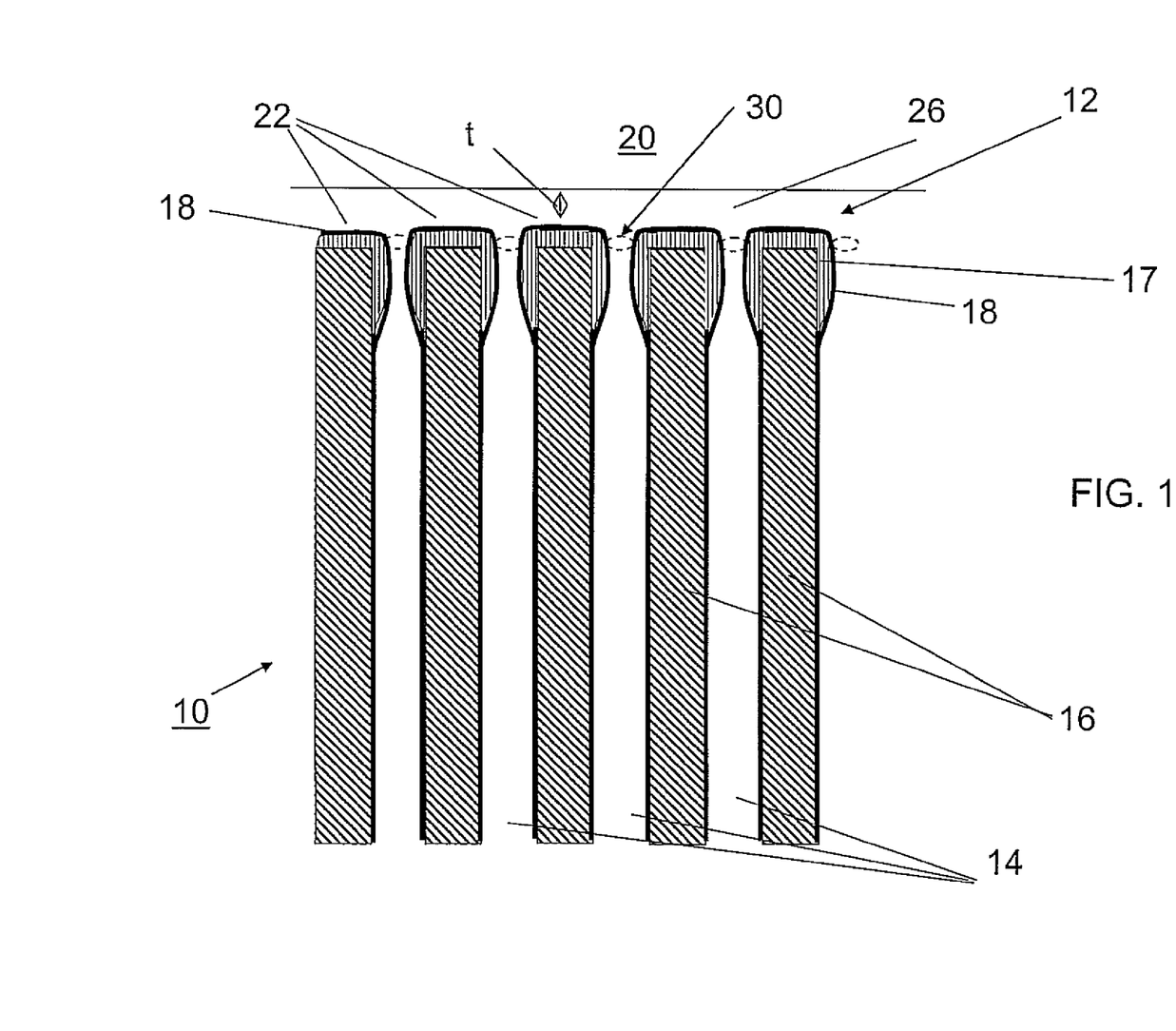
FIG. 1 is a cross-sectional view taken along a longitudinal axis of nanotubes or nanochannels through a membrane showing the nanochannels forming a double electrical layer in accordance with one illustrative embodiment.

Referring now to the drawings in which like numerals represent the same or similar elements and initially to FIG. 1, across-sectional view of a nanoscale filter 10 in accordance with the present principles is illustratively shown. Filter 10 includes arrays 12 of parallel nanopores or channels 14 which are formed into a membrane material 16. A surface of the nanopore or channel 14 is configured with a material 18, which has a high negative surface charge (or high positive surface charge depending on the application) when exposed to an electrolyte 20, such as salt water. In one embodiment, a deposition material 17 may be deposited to narrow the openings in the nanotubes 14. The material 17 is preferably deposited using, e.g., a chemical vapor deposition (CVD) or a physical vapor deposition (PVD). Material 17 is needed only to adjust the size of the channels 14 and may be omitted if channels 14 are of sufficient size using a layer of material 18.

In one embodiment, the material 18 may include, for example, titanium dioxide or silicon dioxide. In the electrolyte 20, a negative surface charge on surfaces 22 will attract positive ions (counter-ions) in the electrolyte 20, which forms an electrical double layer 26 (in a vicinity of layer 18). A positive surface charge on surface 22 will attract negative ions (anions) in the electrolyte 20, which forms the electrical double layer 26. The double layer 26 includes the surface charge of the nanochannels 14 and the electrolytically responsive ions thereto.

In one embodiment, a thickness t of the electrical double layer will depend on a charge density of the electrolyte 20, and is around 1 nm when electrolyte densities are in the range of 1.0 molarity (M). As an example, if the thickness of this electrical double layer is about ½ of a pore or channel diameter, the counter-ion regions from one side of the pore or channel will merge with the region from the opposite site, forming a region 30 across the pore or channel diameter which contains only positive charge, since the negative charge is repelled by the negative surface charge 22 of the nanopore or nanochannel surface. This effect blocks the transport of negative ions through the channel, and is effectively a negative ion filter. The opposite polarity effect should occur for a surface which is positively charged, such as, with a silicon nitride surface.

Referring again to FIG. 1, for sea water, the charge density of ions is such that the thickness of the electrical double layer 26 is on the order of 1 nm, so a nanopore or nanochannel of diameter less than 3 nm would be needed. Lower concentration salt water would allow the usage of a larger diameter nanopore or channel. One criteria being a ratio of approximately 2:1 for the diameter of the pore or channel compared to the thickness of electrical double layer in the salt-water (electrolyte).

Figure 2:
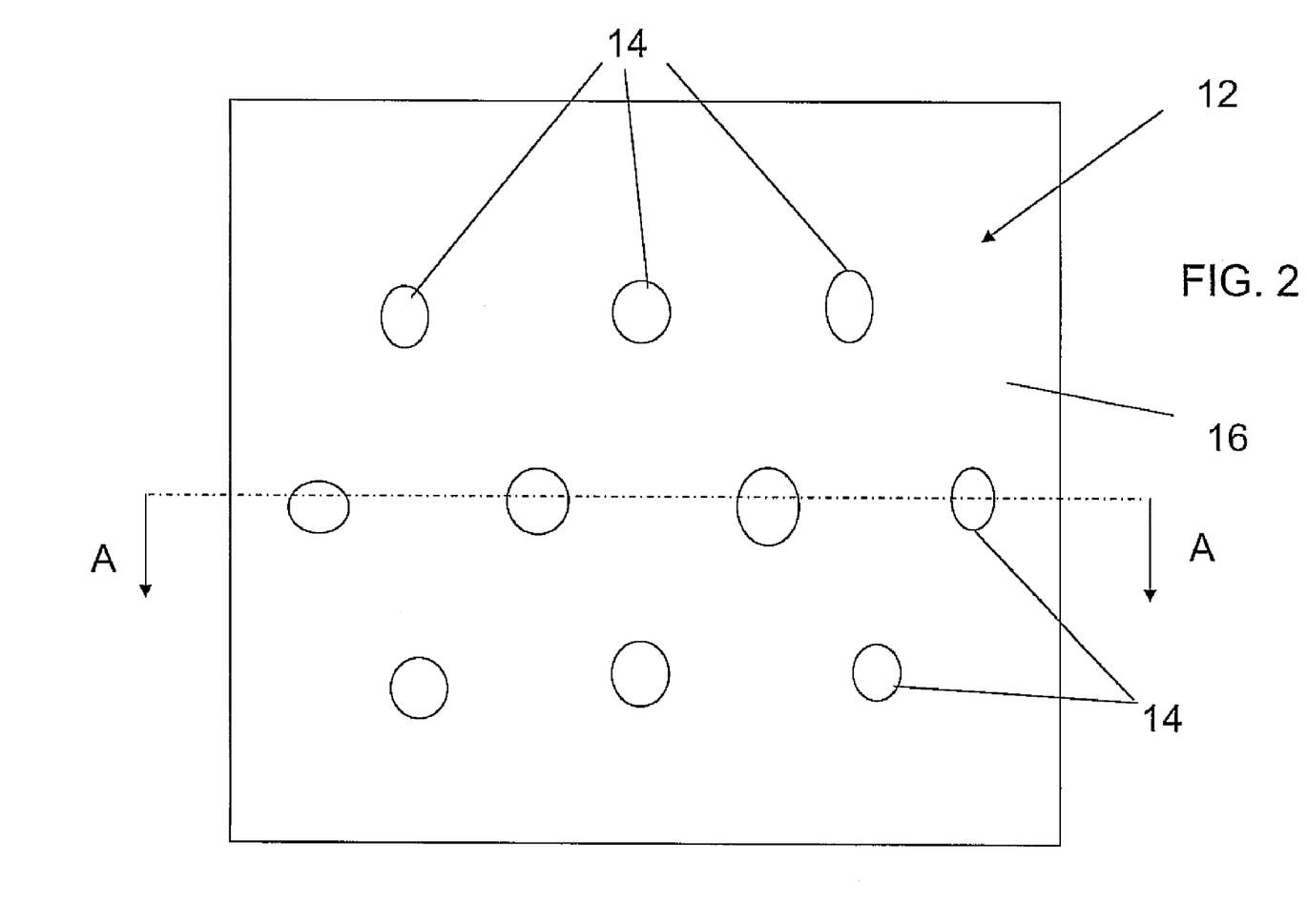
FIG. 2 is a top view of a membrane showing nanochannels and locating a section A-A in accordance with one illustrative embodiment.

Referring to FIG. 2, a top view looking into an array 12 of nanopores or nanochannels 14 is illustratively shown. A device or membrane 10 can be fabricated with parallel nanopores or nanochannels 14 on the scale of 3 nm-20 nm in diameter. Other sizes are also possible and may be employed depending on the application. One approach to accomplish this would be to form nanochannels 14 in aluminum foils (16) using anodic aluminum oxide (AAO) (See e.g., O. Jessensky et al., "Self-organized formation of hexagonal pore arrays in anodic alumina" Appl. Phys. Lett, 72, (1998) p 1173, also G. Sklar et al, "Pulsed deposition into AAO templates for CVD growth of carbon nanotube arrays", Nanotechnology, 16 (2005) 1265-1271). This process forms high aspect ratio, parallel channels into A1 by an anodic oxidation process.

Figure 3:
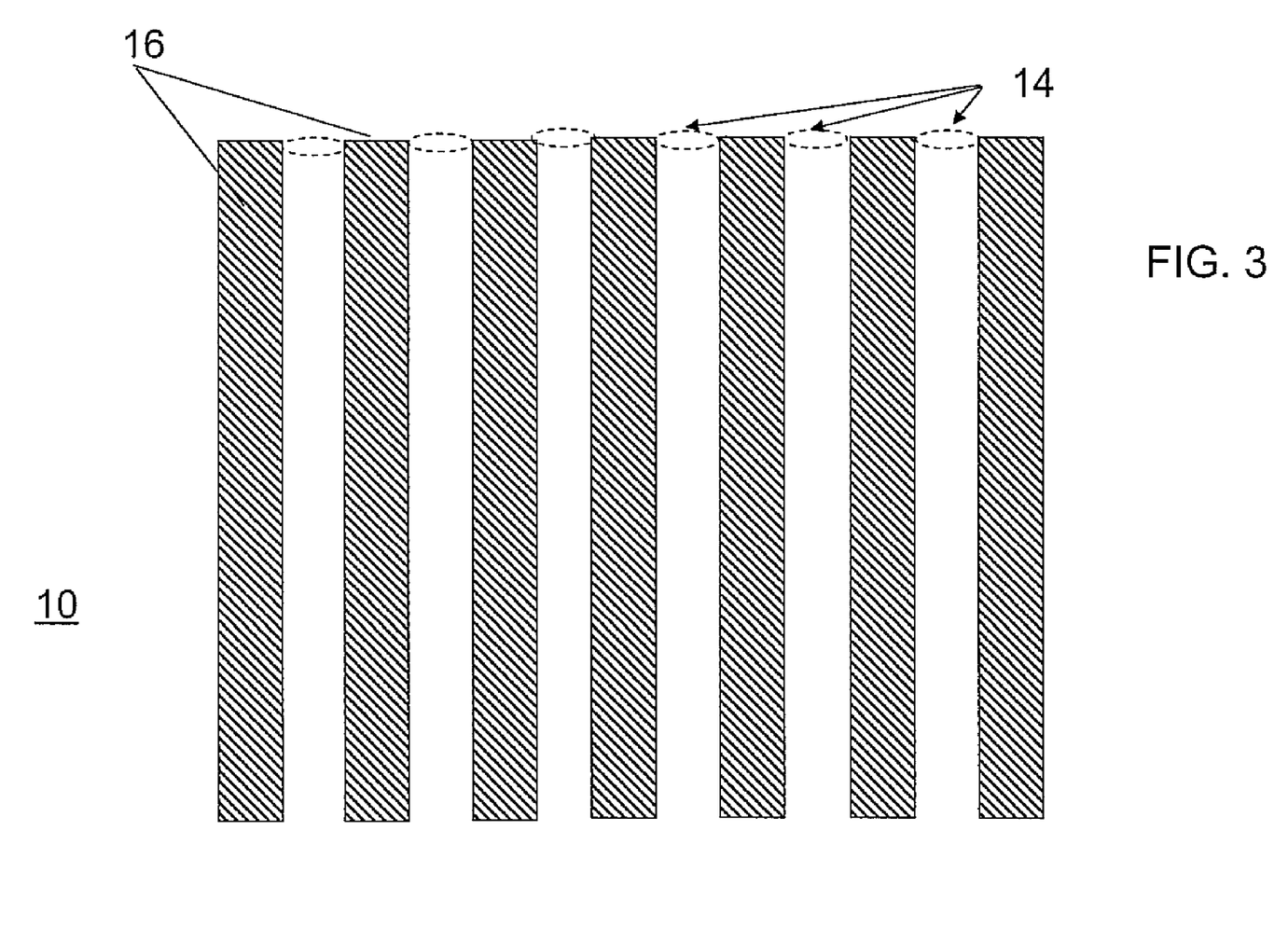
FIG. 3 is a cross-sectional view taken along section A-A of FIG. 2 showing the formation of nanotubes or nanochannels through the membrane in accordance with one illustrative embodiment.

Referring to FIG. 3, a cross-sectional view taken at section A-A of FIG. 2 is illustratively shown. Nanotubes or channels 14 are formed in a parallel manner through material 16.

Figure 4:
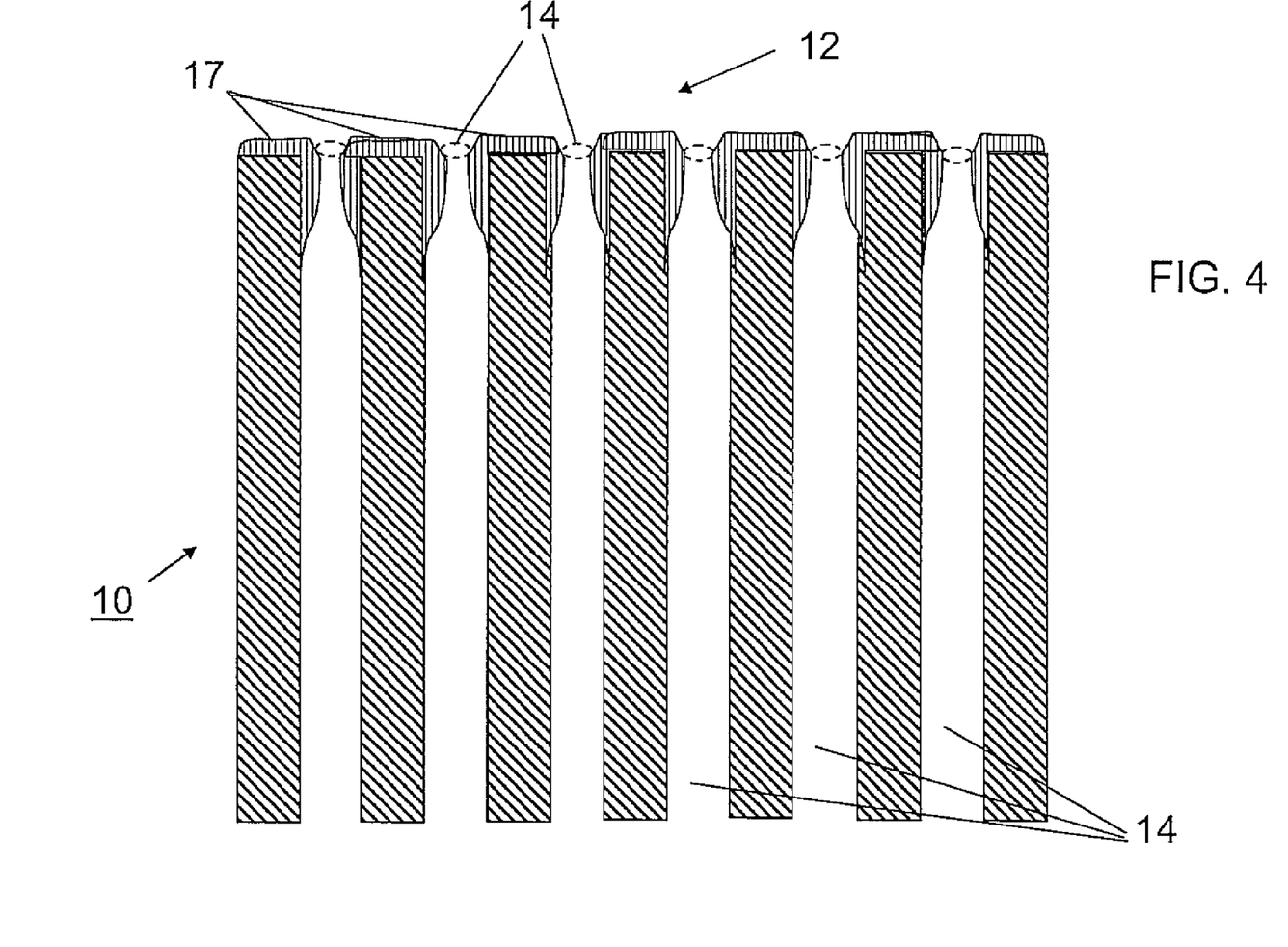
FIG. 4 is a cross-sectional view showing a surface charge layer formed over one end portion of the nanotubes or nanochannels in accordance with one illustrative embodiment.

Referring to FIG. 4, once the array 12 of nanochannels 14 is formed, the surface can be conditioned by depositing material 17, such as, $SiO_2$ or other suitable material preferably using a chemical vapor deposition (CVD) technology or sputter deposition (known as Physical Vapor Deposition or PVD). The goal here is to close off the top aperture of the nanochannel 14. Both PVD and CVD are not very conformal deposition technologies; they tend to clog the channel at the opening of the hole. By controlling the thickness of this deposition, the opening of the nanochannel can be controllably shrunk to any dimension. The material used for this can have an impact on the surface charge, or else it can be covered over with a thin layer of $TiO_2$ or other charge material 18 (FIG. 1 or FIG. 5), using, e.g., atomic layer deposition (ALD), which forms a surface with a high negative surface charge. Alternately, material 18 may include a material for a positively charged surface. The material 18 may be deposited on one end of the nanochannel 14.

Figure 5:
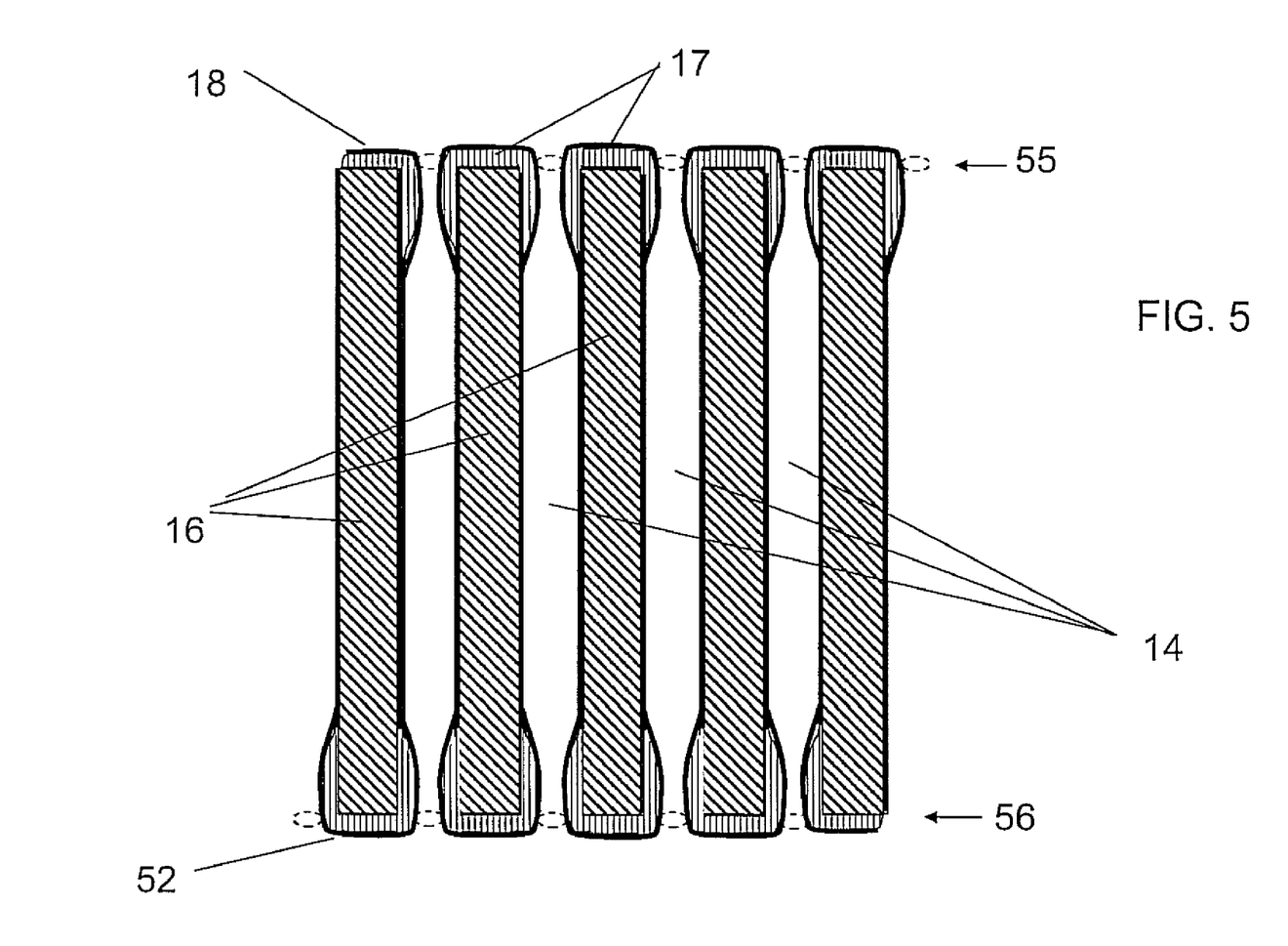
FIG. 5 is a cross-sectional view showing two surface charge layers formed over two end portions of the nanotubes or nanochannels in accordance with another illustrative embodiment.

Referring to FIG. 5, if desired, a second layer 52 of material could be deposited on the far end of the nanochannel 14. For example, a first end portion 55 includes a negatively charged surface while a second end portion 56 includes a positively charged surface. In one embodiment, silicon nitride may be deposited by a plasma-enhanced CVD or a reactive sputter deposition process to form a surface with a positive surface charge. The opening of each end of the nanochannel 14 can be adjusted to the 3-10 nm range by controlling both the initial diameter of the nanochannel 14 in AAO (e.g., 20 to 200 nm) and the subsequent deposition of a filler material 17, or the surface coating material 18 (and/or 52). It is only necessary for this coating 18 (or 52) to occur at the very ends of the channel, since that is where the electrostatic filtering of ions will take place.

Figure 6:
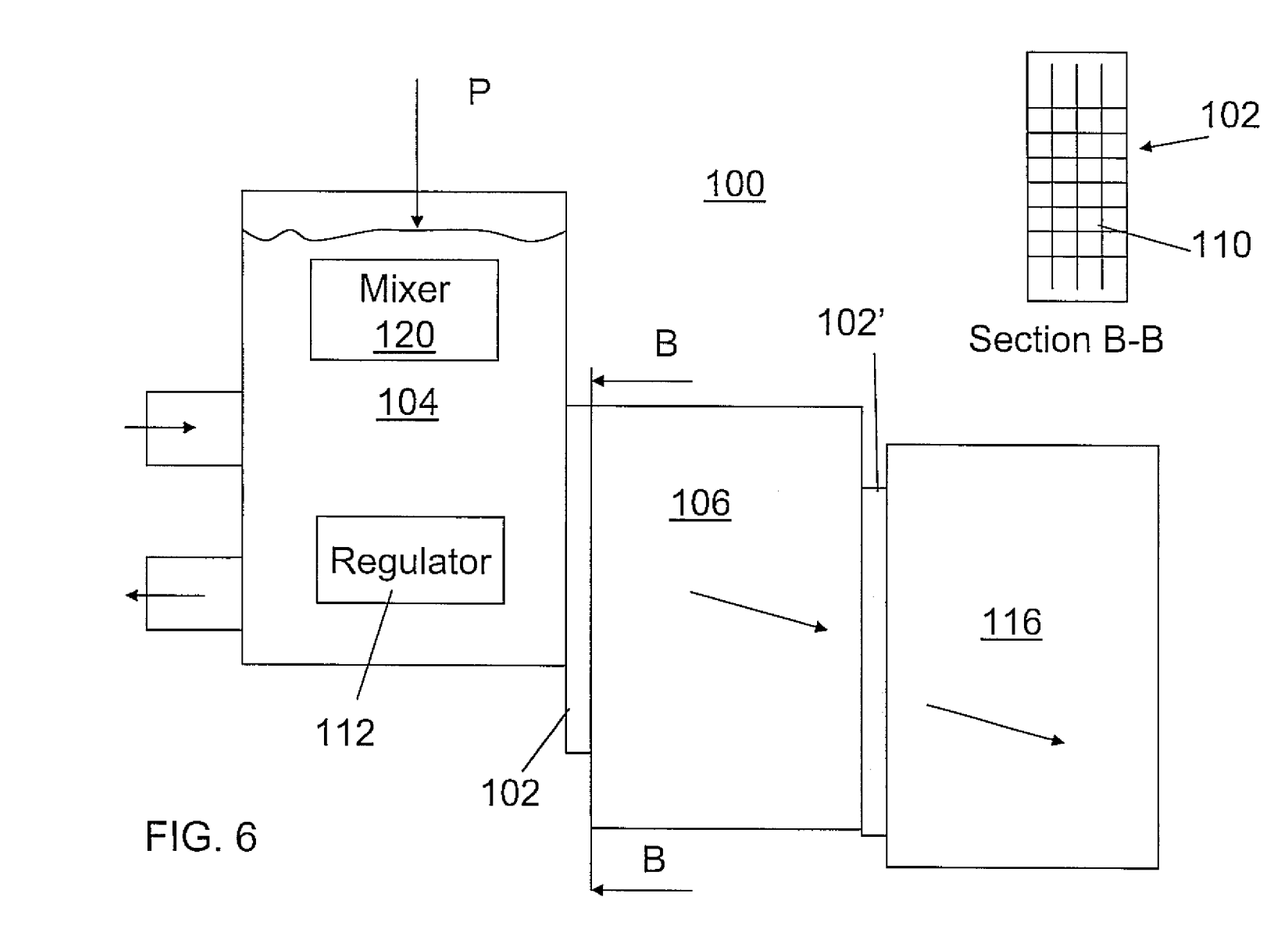
FIG. 6 is a block diagram illustrative depicting a desalination system in accordance with an illustrative embodiment.

Referring to FIG. 6, a desalination device 100 includes a membrane or filter 102 having a large array of parallel nanochannels. The membrane 102 may be configured on a grid, mesh or other structural member 110 for strength. The nanochannel arrays of membrane 102 separate a fluid volume in a first reservoir or container 104, e.g., containing a salt water solution from a second volume 106 in which the sodium and chlorine ions do not penetrate, hence forming desalinated water. The application of pressure P to the salinated side would increase the permeation of water molecules through the nanopore/nanochannel array of the membrane 102 up to a point. At a high enough pressure P, the flow of water through the apertures would exceed the ability of the surface charges to reflect the ions, and hence the ionic filtering capability would break down. The volume 104 in FIG. 6 could have flow into and out of the volume 104. It should be noted that the flow of water into volume 104 should be well mixed to prevent a significant build up of ionic charge in the volume 104. Salinity of water in volume 104 should be regulated over time because as the desalinated water leaves, the salt stays behind. This will increase the concentration until eventually the surface charge can no longer block the nanochannels of membrane 102. It is therefore preferably to have an open system where water is replenished to counter build up in ionic concentration. A mixer or other perturbation device 120 may be useful to stir the water in volume 104.

A critical flow could be calculated in a manner using Child's Law, in which the charges within the aperture shield the upstream charges from the applied fields, and hence at that point (and flow), ionic filtering would cease. A pressure regulator device 112 may be employed to maintain the pressure P at or below this critical pressure value to ensure proper functioning of the desalination system 100. Alternately, a container may be configured to provide a working pressure P using the height of a water column in the fluid volume or container 104 or by other means.

In one embodiment, the arrays of parallel nanopores or channels in the membrane 102 are coated on one end with a material to create a negative surface charge (e.g., titanium dioxide or silicon dioxide). In another embodiment, the other end may be coated with a material to create a positive surface charge (e.g., silicon nitride). Note coating one end, for example, with a negative (or positive) surface charge material will work for both types of ions. The high surface charges in an electrolyte attract or repel ions and form an electrical double layer at one or more end to repel ions. The thickness of this electrical double layer may be about 1 nm for electrolyte densities in the 1.0 M range (e.g., sea water). For a thickness of this electrical double layer of half the pore diameter, the transport of ions through the channel is blocked and an ion filter is formed.

The embodiment depicted in FIG. 6 may be extended to include a plurality of membranes in series to further refine the filtration. In one embodiment, different filtration stages may be employed wherein at each stage pressure is controlled to ensure that each stage is performing efficiently. This may include increasing or decreasing the intermediate pressures of the fluid at each stage.

A sequential embodiment may include additional membranes 102' and stages 116 for filtering at different dimensions. For example, sea water in the first volume 104 could go through an intermediate filter (102) first, which would block some but not all of the ions. A second-stage filter 102' could then be used with has different diameters for nanochannels and hence blocks a different concentration.

While desalination of water has been described as an illustrative example, other fluids may be filtered in accordance with the present principles. In addition, different materials and combinations of materials may be employed to provide electrostatic filtering. Advantageously, a desalination system can be provided that is passive (does not require a power source) and may be employed as an inexpensive desalination system, an emergency desalination system (e.g., on life rafts) etc.

Figure 7:
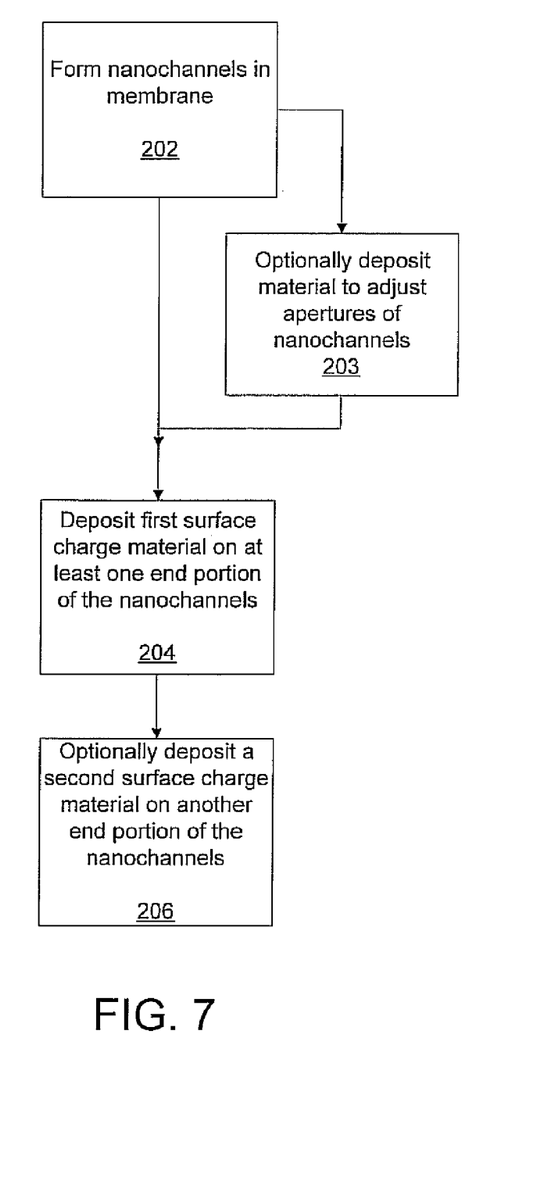
FIG. 7 is a flow diagram showing a method for making a filter in accordance with the present principles.

Referring to FIG. 7, a flow diagram is shown for an illustrative method for making a filter in accordance with the present principles. In block 202, a plurality of nanochannels is formed in a membrane. The forming may include using anodic aluminum oxide to form the nanochannels in an aluminum membrane. The nanochannels may include a diameter of between about 3 nm and 200 nm.

In block 203, a material may be deposited to adjust the apertures of the nanochannels. The material is preferably deposited using a CVD or PVD process to incrementally narrow the channel openings to provide an appropriate aperture dimension.

In block 204, a surface charge material is deposited on at least one end portion of the nanochannels. The surface charge material includes a surface charge to electrostatically influence ions in an electrolytic solution such that the nanochannels reflect ions back into the electrolytic solution while passing a fluid of the electrolytic solution. In block 206, a second surface charge material may be deposited on a second end portion of the nanochannels. The second material includes a surface charge to electrostatically influence ions in an electrolytic solution such that the nanochannels reflect ions back into the electrolytic solution while passing the fluid of the electrolytic solution.

In an alternative embodiment, depositing the first surface charge material may include depositing the first surface charge material on first locations on a first end portion of the nanochannels, and depositing a second surface charge material on second locations on the first end portion of the nanochannels, such that the first and second surface charge materials provide opposite polarities for the surface charge. Different polarities may exist on a same side of the membrane by using resist masks or other large scale integration techniques. In addition, one configuration may include different surface polarities on a same side of the membrane and different polarites on the opposite side of the membrane. Different patterns and different configurations may be provided. For example, the first surface charge material may include a material having a negative surface charge to repel negative ions and a positive surface charge to repel positive ions on an opposite side of the membrane or on the same side of the membrane, etc. It should be understood that the illustrative examples as described here may be combined in any manner and provide many useful configurations in accordance with the present principles.

Figure 8:
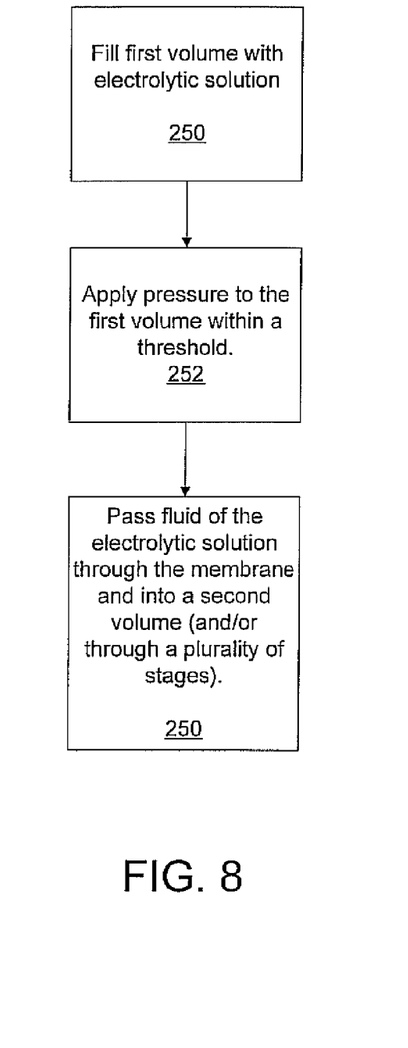
FIG. 8 is a flow diagram showing a method for using a filter in accordance with the present principles.

Referring to FIG. 8, a flow diagram is shown for an illustrative method for using a filter in accordance with the present principles. In block 250, a first volume is filled with an electrolytic solution. This volume is preferably mixed or constantly replenished. In block 252, a pressure is applied to the electrolytic solution in the first volume that is below a pressure threshold value. In block 254, a fluid of the electrolytic solution is passed into a second volume separated from the first volume by a membrane. The membrane has a plurality of nanochannels formed therein as described above. The fluid in the second volume is desalinated or partially desalinated. Additional stage may be added.

Having described preferred embodiments of a surface charge enabled nanoporous semi-permeable membrane for desalination (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A filter, comprising:
    a membrane having a plurality of parallel nanochannels formed in an aluminum substrate by anodic aluminum oxidation;
    a first surface charge material deposited on at least one end portion of the nanochannels, the first surface charge material including a surface charge to electrostatically influence ions in an electrolytic solution such that the nanochannels reflect ions back into the electrolytic solution while passing a fluid of the electrolytic solution; and
    a second surface charge material deposited on a second end portion of the nanochannels, the second surface charge material including a surface charge to electrostatically influence ions in an electrolytic solution such that the nanochannels reflect ions back into the electrolytic solution while passing the fluid of the electrolytic solution.

2. The filter as recited in claim 1, wherein the nanochannels include a diameter of between about 3 nm and 200 nm.

3. The filter as recited in claim 1, wherein the first surface charge material includes a material having a negative surface charge to repel negative ions.

4. The filter as recited in claim 3, wherein the first surface charge material includes at least one of titanium oxide and silicon oxide.

5. The filter as recited in claim 1, wherein the first surface charge material includes a material having a positive surface charge to repel positive ions.

6. The filter as recited in claim 5, wherein the first surface charge material includes silicon nitride.

7. The filter as recited in claim 1, wherein the nanochannels include an aperture dimension narrowed by a deposited material.

8. The filter as recited in claim 1, wherein the electrolytic solution includes sea water and the nanochannels include an aperture of between about 1 nm to about 3 nm.

9. A filter system, comprising:
a first volume configured to receive an electrolytic solution at a pressure; and
a second volume separated from the first volume by a membrane having a plurality of parallel nanochannels formed in an aluminum substrate by anodic aluminum oxidation, and the nanochannels including:
a first surface charge material deposited on at least one end portion of the nanochannels, the first surface charge material including a surface charge to electrostatically influence ions in an electrolytic solution such that the nanochannels reflect ions back into the electrolytic solution while passing a fluid of the electrolytic solution; and
a second surface charge material deposited on a second end portion of the nanochannels, the second surface charge material including a surface charge to electrostatically influence ions in an electrolytic solution such that the nanochannels reflect ions back into the electrolytic solution while passing the fluid of the electrolytic solution.

10. The filter system as recited in claim 9, further comprising a pressure regulator configured to regulate the pressure of the first volume.

11. The filter system as recited in claim 9, further comprising a support structure configured to support the membrane against the pressure.

12. The filter system as recited in claim 9, further comprising a mixer configured to mix fluid in the first volume.

13. The filter system as recited in claim 9, further comprising a plurality of membranes sequentially arranged to filter the electrolytic fluid and filtered electrolytic fluid.

14. The filter as recited in claim 1, wherein the nanochannels include a diameter of about double a size of an electrical double layer formed by the electrostatically influenced ions in an electrolytic solution.

15. The filter as recited in claim 7, wherein the aperture dimension is controlled by controlling a deposition rate of the deposited material.

16. The filter as recited in claim 1, wherein the first surface charge material is deposited on a filler layer formed over the at least one end portion of the nanochannels, the filler material adjusting an initial diameter of the nanochannels.

17. The filter system as recited in claim 9, wherein the first surface charge material includes a material having a negative surface charge to repel negative ions.

18. The filter system as recited in claim 9, wherein the first surface charge material includes a material having a positive surface charge to repel positive ions.

19. The filter system as recited in claim 9, wherein the nanochannels include an aperture dimension narrowed by a deposited material.

20. The filter system as recited in claim 19, wherein the aperture dimension is controlled by controlling a deposition rate of the deposited material.

21. The filter system as recited in claim 9, wherein the nanochannels include a diameter of about double a size of an electrical double layer formed by the electrostatically influenced ions in an electrolytic solution.

22. The filter system as recited in claim 9, wherein the first surface charge material is deposited on a filler layer formed over the at least one end portion of the nanochannels, the filler material adjusting an initial diameter of the nanochannels.

23. A filter, comprising:
a membrane having a plurality of parallel nanochannels formed in an aluminum substrate by anodic aluminum oxidation; and
a first surface charge material deposited on at least one end portion of the nanochannels, the first surface charge material including a surface charge to electrostatically influence ions in an electrolytic solution such that the nanochannels reflect ions back into the electrolytic solution while passing a fluid of the electrolytic solution, wherein the first surface charge material includes a material having a positive surface charge to repel positive ions, the first surface charge material including silicon nitride.

* * * * *